(12) United States Patent
Kuo

(10) Patent No.: US 9,172,964 B2
(45) Date of Patent: Oct. 27, 2015

(54) SYSTEMS AND METHODS FOR CHANGING RATE-CONTROL SETTING DURING VIDEO ENCODING

(75) Inventor: Chih-Hui Kuo, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 2324 days.

(21) Appl. No.: 11/393,268

(22) Filed: Mar. 30, 2006

(65) Prior Publication Data

US 2007/0237220 A1    Oct. 11, 2007

(51) Int. Cl.
| | |
|---|---|
| *H04N 19/146* | (2014.01) |
| *H04N 19/115* | (2014.01) |
| *H04N 19/61* | (2014.01) |
| *H04N 19/114* | (2014.01) |
| *H04N 19/124* | (2014.01) |
| *H04N 19/132* | (2014.01) |
| *H04N 19/162* | (2014.01) |
| *H04N 19/587* | (2014.01) |

(52) U.S. Cl.
CPC .......... *H04N 19/146* (2014.11); *H04N 19/114* (2014.11); *H04N 19/115* (2014.11); *H04N 19/124* (2014.11); *H04N 19/132* (2014.11); *H04N 19/162* (2014.11); *H04N 19/587* (2014.11); *H04N 19/61* (2014.11)

(58) Field of Classification Search
CPC . H04N 19/114; H04N 19/115; H04N 19/124; H04N 19/132; H04N 19/162; H04N 19/587; H04N 19/61; H04N 19/146; H04N 19/176

USPC ....................................................... 375/240.06
See application file for complete search history.

(56) References Cited

U.S. PATENT DOCUMENTS

| | | | | |
|---|---|---|---|---|
| 5,481,543 | A  * | 1/1996 | Veltman ........................ | 370/473 |
| 6,621,933 | B2 * | 9/2003 | Chung et al. .................. | 382/233 |
| 6,865,224 | B1 * | 3/2005 | Knee et al. ............... | 375/240.03 |
| 7,116,835 | B2 * | 10/2006 | Takahashi et al. ............ | 382/251 |
| 7,418,147 | B2 * | 8/2008 | Kamaci et al. ................ | 382/251 |
| 7,827,036 | B2 * | 11/2010 | Tominaga ..................... | 704/500 |
| 2002/0131496 | A1* | 9/2002 | Vasudevan et al. ...... | 375/240.11 |

FOREIGN PATENT DOCUMENTS

WO        9900978        1/1999

* cited by examiner

*Primary Examiner* — Anner Holder
(74) *Attorney, Agent, or Firm* — McClure, Qualey & Rodack, LLP

(57) ABSTRACT

Methods for changing a rate-control (RC) setting during video encoding, performed by an RC controller and a video encoder, are provided. An embodiment of the method comprises determining whether change in the RC setting is allowed for encoding a next portion of a video sequence, detecting a request for changing the RC setting before encoding the next portion of the video sequence if the RC setting is allowed to be changed; and executing video encoding for the next portion of the video sequence ceaselessly utilizing the changed RC setting when detecting the request.

18 Claims, 16 Drawing Sheets

# SYSTEMS AND METHODS FOR CHANGING RATE-CONTROL SETTING DURING VIDEO ENCODING

BACKGROUND

The invention relates to video encoding, and more particularly, to systems and methods for changing a rate-control setting during video encoding.

A video sequence (VS) can be seen as a series of static frames, requiring considerable storage capacity and transmission bandwidth. A 90-min full color video stream, for example, having 640×480 pixels/frame and 15 frames/second, requires bandwidth of 640×480 (pixels/frame)×3(bytes/pixel)×15(frames/sec)=13.18(MB/sec) and file size of 13.18 (MB/sec)×90×60=69.50(GB). Such a sizeable digital video stream is difficult to store and transmit in real time, thus, many encoding techniques have been introduced to reduce the required memory size and transmission bandwidth.

MPEG standards ensure video encoders create standardized files that can be opened and played on any system with a standards-compliant decoder. Digital video contains spatial and temporal redundancies, which may be encoded without significant sacrifice. MPEG coding is a generic standard, intended to be independent of a specific application, involving encoding based on statistical redundancies in temporal and spatial directions. Spatial redundancy is based on the similarity between adjacent pixels. MPEG encoding employs intra-picture spatial compression to remove spatial redundancy by using DCT (Discrete Cosine Transform). Temporal redundancy refers to identical pixels repeatedly shown in adjacent video frames, providing smooth, realistic motion in video. MPEG relies on prediction, more precisely, motion-compensated prediction, for temporal encoding between frames. MPEG utilizes, to create temporal encoding, I-Frames, B-frames and P-frames. An I-frame is an intra-coded frame, a single image heading a sequence. I-frames are only encoded to reduce spatial redundancy within the frame with no reference to previous or subsequent frames. P-frames are forward-predicted frames, encoded with reference to a previous I- or P-frame, with pointers to information in a previous frame. B-frames are encoded with reference to a previous reference frame, a subsequent reference frame, or both. Motion vectors employed may be forward, backward, or both.

MPEG achieves encoding by quantizing the coefficients produced by applying DCT to 8×8 blocks of pixels in an image and through motion compensation. Quantization is basically division of the DCT coefficient by a quantization scale related to quality level, with higher indices for better encoding efficiency but lower quality, and lower indices for the reverse.

Typical approaches for a MPEG video encoder utilize a constant bit-rate (CBR) for a group of picture (GOP) regardless of the complexity of each video interval. Bit-rate is used to determine the video quality and defines how much physical space that one second of video requires in bits. CBR technique assumes equal weighting of bit distribution among GOPs which results in reducing the degree of freedom of the encoding task. The CBR encoding outputs a bitstream with a output rate kept at almost the same rate regardless of the content of the input video. As a result, for a video interval with simple content, the encoding quality will be good; however, for a video interval with complex content, the encoding quality will be poor. Generally speaking, the encoding quality of the CBR encoding is not smooth.

Since the VS is inherently variable, a better encoding approach has been introduced by employing a variable birate (VBR) encoder algorithm. Generally speaking, a VBR encoder produces non-constant output bit-rate during a period of time, and a complex frame consumes a higher bit-rate than that of a plain frame. As a result, the encoding quality of the VBR encoding is more smooth than that of a CBR encoding.

SUMMARY

Methods for changing at least one rate-control (RC) setting, performed by an RC controller, are provided. An embodiment of a method for changing the RC setting comprises the following steps. It is determined whether change in the RC setting is allowed for encoding a next portion of a video sequence. A request for changing the RC setting is detected before encoding the next portion of the video sequence if the RC setting is allowed to be changed. Video encoding for the next portion of the video sequence utilizing the changed RC setting is ceaselessly executed when detecting the request. The video sequence is structured according to multiple video encoding levels.

Video encoding systems capable of changing at least one rate-control (RC) setting are provided. An embodiment of a system comprises an RC controller and a video encoder. The video encoder encodes a video sequence structured according to multiple video encoding levels. The RC controller determines whether change in the RC setting is allowed for encoding a next portion of the video sequence, detects a request for changing the RC setting before encoding the next portion of the video sequence if the RC setting is allowed to be changed, and controls the video encoder to encode the next portion of the video sequence ceaselessly utilizing the changed RC setting when detecting the request.

BRIEF DESCRIPTION OF THE DRAWINGS

The present invention can be more fully understood by reading the subsequent detailed description and examples with references made to the accompanying drawings, wherein.

DETAILED DESCRIPTION

MPEG or H.26x standards ensure video encoding systems create standardized files that can be opened and played on any system with a standards-compliant decoder. Digital video contains spatial and temporal redundancies, which may be compressed without significant sacrifice. MPEG encoding is a generic standard, intended to be independent of a specific application, involving compression based on statistical redundancies in temporal and spatial directions. Spatial redundancy is based on the similarity between adjacent pixels. MPEG encoding employs intra-picture spatial compression to remove spatial redundancy by using DCT (Discrete Cosine Transform). Temporal redundancy refers to identical temporal motion between successive video pictures, providing smooth, realistic motion in video. MPEG relies on prediction, more precisely, motion-compensated prediction or inter-picture prediction, for temporal compression between pictures. To create temporal compression, MPEG utilizes I-pictures (Intra-coded pictures), B-pictures (bi-directionally predictive-coded pictures) and P-pictures (predictive-coded pictures). I-picture is a single image heading sequence, with no reference to previous or subsequent pictures. P-pictures are forward-predicted pictures, encoded with reference to a previous I- or P-picture, with pointers to information in a previous picture. B-pictures are encoded with reference to a previous reference picture, a subsequent reference picture, or both. Motion vectors employed may be forward, backward, or both.

Figure 1:
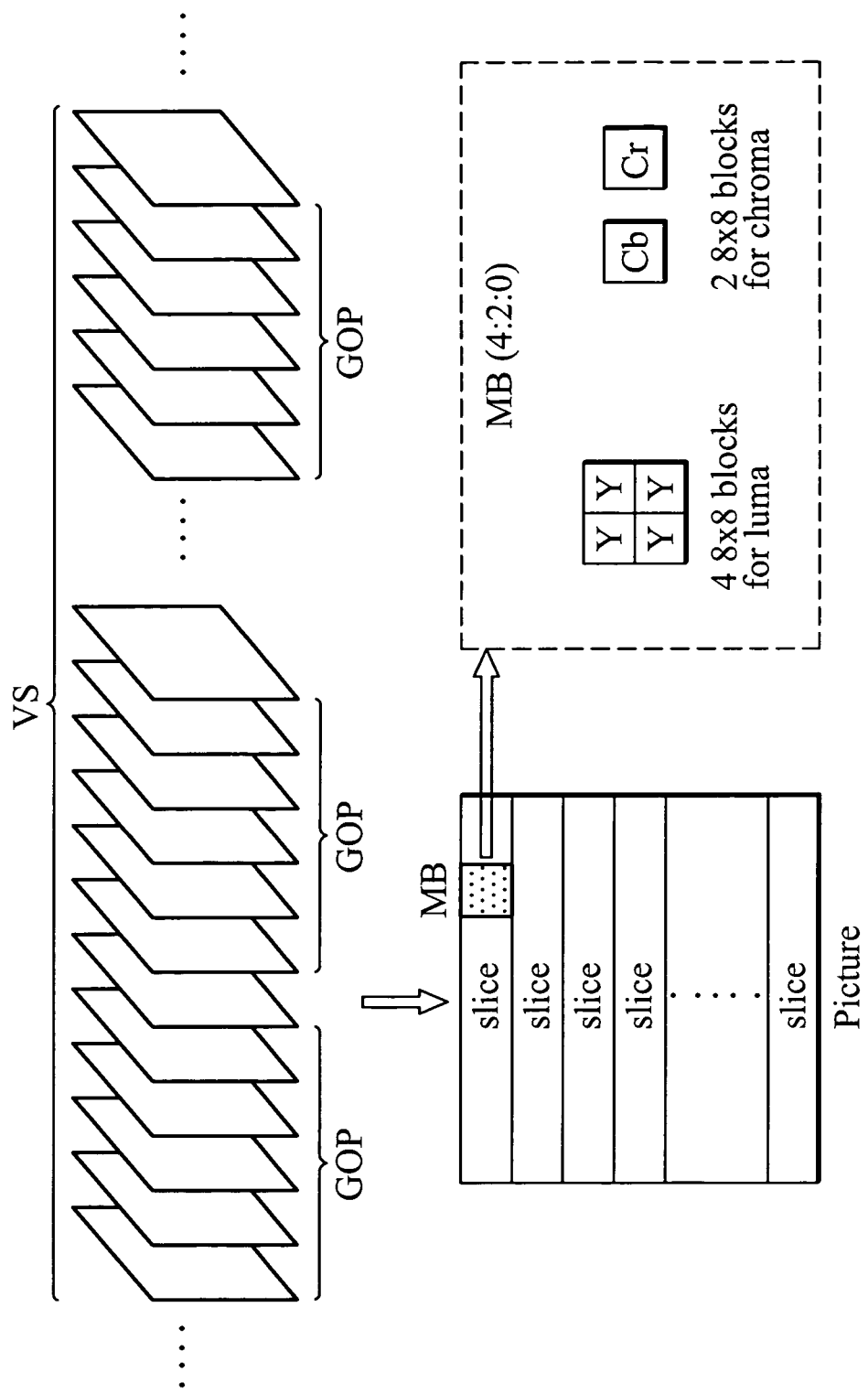
FIG. 1 is a diagram showing the picture architecture of an exemplary MPEG-2 video bitstream.

FIG. 1 is a diagram showing the picture architecture of an exemplary MPEG-2 video bitstream. A video stream (VS) is composed of multiple pictures or groups of pictures (GOPs) that can be arranged in a specified order called the GOP structure. Each picture is divided into one or multiple slices (S). Each S composed of multiple macroblocks (MB). Each MB, typically composed of four blocks of 8×8 pixels of luminance (luma) data and two blocks of 8×8 pixels of chrominance (chroma) data as shown in FIG. 1.

Figure 2:
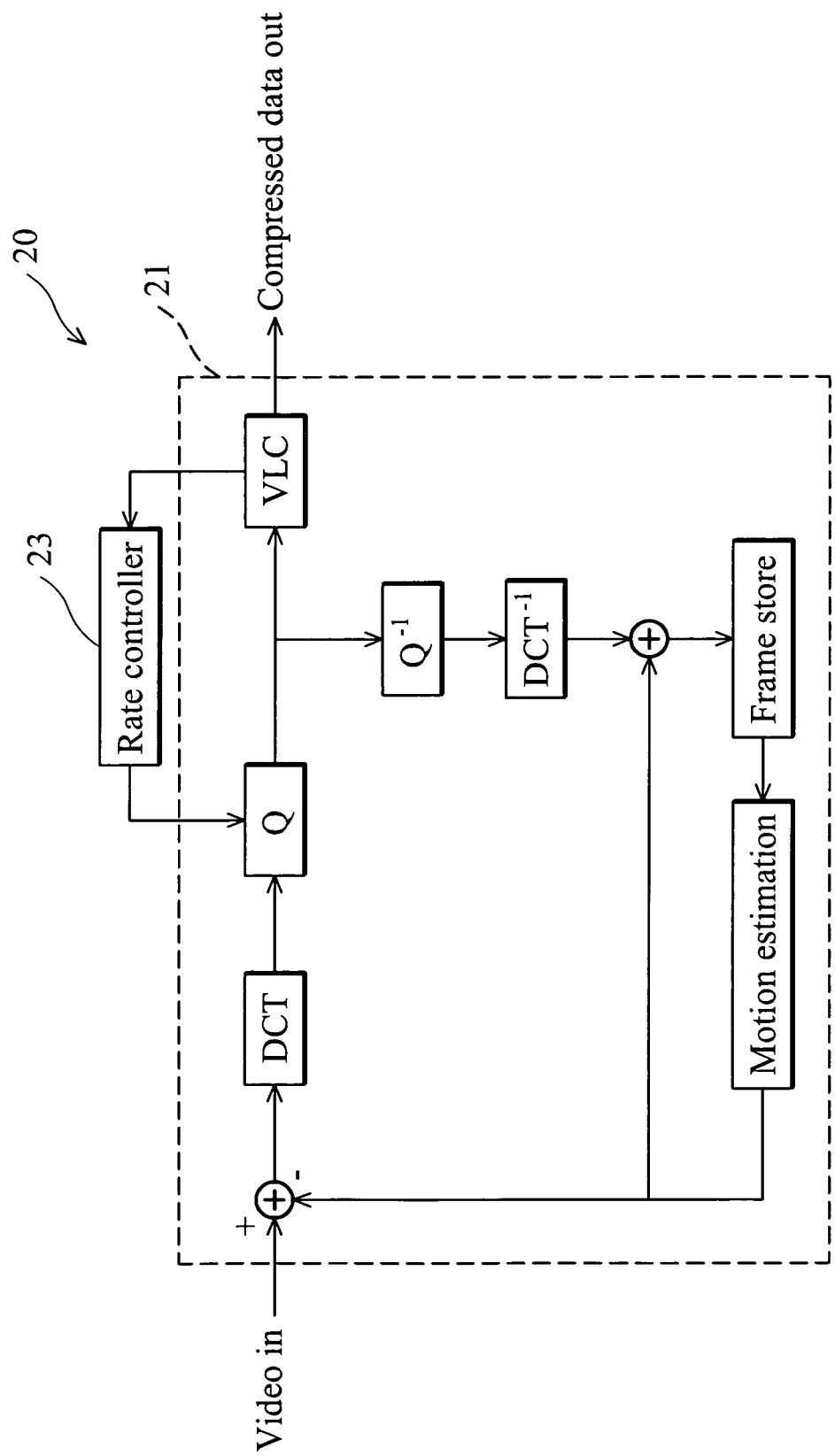
FIG. 2 is a diagram of an embodiment of MPEG encoding employing a rate control mechanism.

FIG. 2 is a block diagram showing an embodiment of MPEG encoding employing a rate control mechanism. An embodiment of a system 20 for changing RC settings during encoding comprises a video encoder 21 and a rate controller 23. In the video encoder 21, the input video is typically processed MB by MB, MBs are blocks of luma data accompanied by corresponding blocks of chroma data. Block-wise motion compensation is used to predict the value of the input video from data in previous pictures. A block transform is applied to reduce spatial statistical correlation. The most popular transform is the 8×8 discrete cosine transform (DCT). The output of the transform is then quantized (Q), and entropy encoding is applied to the quantized values. When a DCT has been used, the coefficients are typically scanned using a zig-zag scan order, and the entropy coding typically combines a number of consecutive zero-valued quantized coefficients with the value of the next non-zero quantized coefficient into a single symbol, and also has special ways of indicating when all of the remaining quantized coefficient values are equal to zero. The entropy coding method typically uses variable-length coding (VLC) tables. A rate control (RC) mechanism such as constant bit rate (CBR) control, variable bit rate (VBR) control or similar, embedded in the rate controller 23, is utilized to control quantization values (e.g. quantization step size) to enable the output bit rate or bit rates to meet a target bit rate or varied target bit rates. CBR control enables that the bit rate at which output data should be consumed is approximately constant. VBR control varies the number of output bits in each segment based on the complexity of the input data in that segment. The goal of VBR is to maintain constant quality instead of maintaining a constant bit rate. More space is allocated to more complex segments while less space is allocated to less complex segments.

Figure 3:
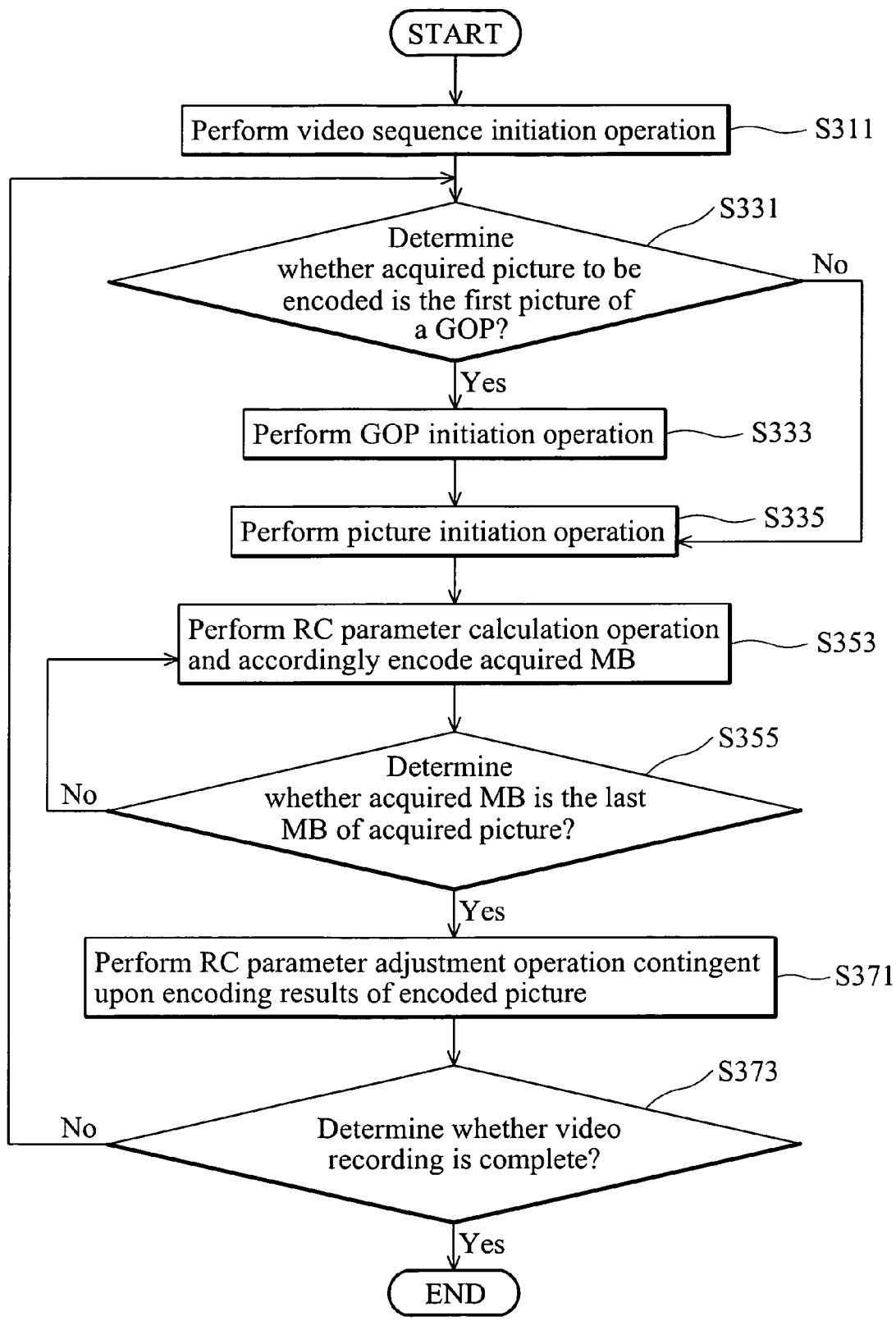
FIG. 3 is a flowchart illustrating an embodiment of a method for rate control incapable of performing RC settings changes during video encoding.

FIG. 3 is a flowchart illustrating an embodiment of a method for rate control, performed in the rate controller 23 (FIG. 2). In step S311, a video sequence initiation operation for encoding a video sequence is performed. Typically, such video sequence initiation operation determines initial values of various RC parameters for video encoding. Exemplary pseudo code (from the MPEG-2 reference software—TM5) executed by a video sequence initiation operation is shown in the following.

```
r = 2*bit_rate/frame_rate
avg_act = 400
R = 0
Xi = 160*bit_rate/115
Xp = 60*bit_rate/115
Xb = 42*bit_rate/115
d0i = 10*r/31
d0p = 10*r/31
d0b = 14*r/31
```

Wherein, two predefined constants "bit_rate" and "frame_rate" respectively represent a predetermined bit quantity and a predetermined frame quantity per second. It is to be understood that "bit_rate" and "frame_rate" being RC settings of entire video sequence are configurable. Such operation may determine, for a video sequence to be encoded, an initial reacting parameter denoted as "r", an average activity magnitude for MBs denoted as "avg_act", base complexity magnitudes for I-pictures, P-pictures and B-pictures respectively denoted as "Xi", "Xp" and "Xb", and base quantization scales respectively denoted as "d0i", "d0p" and "d0b". Note that changing these predefined constants "bit_rate", "frame_rate" or similar affects overall rate control for video encoding, thus, these constants may be considered as RC settings of video sequence level. Those skilled in the art may apply additional or similar RC settings of video sequence level in the video sequence initiation operation.

In step S331, it is determined whether an acquired picture to be encoded is the first picture of a GOP. If so, the process proceeds to step S333, otherwise, to step S335. In step S333, a GOP initiation operation is performed for each GOP when processing the first picture of a GOP. Typically, such GOP initiation operation determines initial values of various RC parameters for the GOP. Exemplary pseudo code performed by a GOP initiation operation is shown in the following.

```
R += (1+np+nb)*bit_rate/frame_rate
Np = fieldpic? 2*np+1 :np
Nb = fieldpic? 2*nb:nb
```

Wherein, two predefined constants "bit_rate" and "frame_rate" respectively represent a predetermined bit quantity and a predetermined frame quantity per second, and two constants "np" and "nb" respectively represent a predetermined quantity of P-pictures and a predetermined quantity of B-pictures in a GOP. It is to be understood that "np" and "nb" being RC settings of GOP structure are configurable. Such operation may determine, for a GOP to be encoded, a bit budget denoted as "R", an initial single-directional prediction region quantity of "progressive" P-pictures, "interlaced" P-pictures or similar, denoted as "Np", and an initial bidirectional prediction region quantity of "progressive" B-pictures, "interlaced" B-pictures or similar, denoted as "Nb". Note that changing constants "np", "nb" or similar affects the rate control determination of a GOP to be encoded, thus, these constants may be represented as RC settings corresponding to a GOP level.

Those skilled in the art may apply additional or similar RC parameters related to the GOP level in the GOP initiation operation.

In step S335, a picture initiation operation is performed for each picture of a GOP to be encoded. Typically, such picture initiation operation determines initial values of various RC parameters for a picture corresponding to a particular picture type such as I-picture, P-picture, B-picture or similar. The determinations typically refer to previously generated results of video sequence and GOP initiation operations. The determinations of a picture initiation operation may also refer to previously generated results of picture initiation operations; Exemplary pseudo code performed by a picture initiation operation is shown in the following.

```
Switch (pict_type) {
    Case I_TYPE:
        T = R/(1+Np*Xp/(Xi*1.0)+Nb*Xb/(Xi*1.4))
        d = d0i
        break
    Case P_TYPE:
        T = R/(Np+Nb*1.0*Xb/(Xp*1.4))
        d = d0p
        break
    Case B_TYPE:
        T = R/(Nb+Np*1.4*Xp/(Xb*1.0))
        d = d0b
        break
}
S = bitcount( )
Q = 0
calc_actj ( )
act_sum = 0.0
```

Wherein, variables "Np", "Nb", "Xp", "Xb", "R", "d0i", "d0p" and "d0b" are previously determined by video sequence and GOP initiation operations. Such operation may determine, for a picture to be encoded, a bit budget denoted as "T", and a quantization scale related parameter denoted as "d". These parameters may be represented as RC settings corresponding to a picture level. Those skilled in the art may apply additional or similar RC settings related to the picture level in the picture initiation operation.

Furthermore, an MB initiation operation for all MBs of a picture to be encoded is performed. Typically, such MB initiation operation determines initial values of various RC parameters for all MBs of a picture. The determinations typically refer to previously generated results of video sequence, GOP, picture, and MB initiation operations, and may further consider a particular quantization scale calculation model such as a linear model, non-linear model or similar. Exemplary pseudo code performed by a MB initiation operation is shown in the following.

```
If (q_scale_type) {
    mquant = 2d*31/r
    if (mquant<1) mquant = 1
    if (mquant>112) mquant = 112
    mquant = non_linear_mquant_table
        [map_non_linear_mquant[mquant]]
} else {
    mquant = d*31/r
    if (mquant<2) mquant = 2
    if (mquant>62) mquant = 62
    prev_mquant = mquant
}
```

Wherein, variables "d" and "r" are previously determined by video sequence, GOP and picture initiation operations. Such operation may determine, for an MB of a picture to be encoded, a base quantization scale denoted as "mquant" by applying a particular quantization scale calculation model. Note that the minimum quantization scales such as "1" in a non-linear model and "2" in a linear model, and the maximum quantization scales such as "62" in a non-linear model and "112" in a linear model may alternatively be configured by users. Changing such minimum and maximum quantization scales or similar affects the rate control determination of the MBs to be encoded, thus, these parameters may be represented as RC settings corresponding to an MB level. Those skilled in the art may apply additional or similar RC settings related to the MB level in the MB initiation operation.

In step S353, an RC parameter calculation operation is performed for a particular MB to be encoded. Typically, such RC parameter calculation operation determines RC parameters for a particular MB to be encoded by considering consumption of bits by previous encoded MBs and complexity of the current MB. The calculations typically refer to previously generated results of video sequence, GOP, picture and MB initiation operations and previously performed RC parameter calculation operations, and may further consider a particular quantization scale calculation model. Exemplary pseudo code performed by an RC parameter calculation operation is shown in the following.

```
dj = d + (bincount( )-S)-j*T/(mb_width*mb_height2)
Qj = dj*31/r
actj = mbinfo[j].act
actsum += actj
N_actj = (2*actj+avg_act)/(actj+2*avg_act)
If (q_scale_type) {
    mquant = 2*Qj*N_actj
    if (mquant<1) mquant = 1
    if (mquant>112) mquant = 112
    mquant = non_linear_mquant_table[map_non_
        linear_mquant[mquant]]
} else {
    mquant = Qj*N_actj
    if (mquant<2) mquant = 2
    if (mquant>62) mquant = 62
    if (mquant>=8 && (mquant-prev_mquant>=-4&&(mquant-
        prev_mquant<=4)))
        mquant = prev_mquant
    prev_mquant = mquant
}
Q += mquant
```

Wherein, two predefined constants "mb_width" and "mb_height2" respectively represent a predetermined MB width and a predetermined MB height in a picture, and variable "j" represents a sequential number for a MB to be encoded. It is to be understood that "mb_width" and "mb_height2" being RC settings of MBs are configurable. Parameters "d", "S", "actsum" and "r" are previously determined by video sequence, GOP, picture and MB initiation operations and previously performed RC parameter calculation operations. Such operation may determine, for a particular MB to be encoded, a quantization scale denoted as "mquant" by applying a particular quantization scale calculation model. Changing "Qj" or similar affects the rate control determination of a MB to be encoded, thus, these RC settings may be represented as RC settings corresponding to a MB level. Those skilled in the art may apply additional or similar RC settings related to the MB level in the RC parameter calculation operation. Note that each MB is subsequently encoded according to results calculated by the RC parameter calculation operation.

In step S355, it is determined whether an MB to be encoded is the last MB of the acquired picture. If so, the process proceeds to step S371, otherwise, to step S353. In step S371, an RC parameter adjustment operation is performed contingent upon the encoding results of the acquired pictures. Typically, such RC parameter adjustment operation adjusts RC parameters for a particular picture type for subsequent RC operations contingent upon the encoding results. The adjustment typically refers to the actual consumption of bits and complexity accumulation of MBs after encoding a picture. Exemplary pseudo code performed by an RC parameter adjustment operation is shown in the following.

```
S = bitcount( ) - S
R -= S
X = S*0.5*Q/(mb_width*mb_height2)
d += S - T
avg_act = actsum/(mb_width*mb_height2)
switch (pict_type) {
    case I_TYPE:
        Xi = X
        d0i = d
        break
    case P_TYPE:
        Xp = X
        d0p = d
        Np --
        Break
    case B_TYPE:
        Xb = X
        d0b = d
        Nb --
        Break
}
```

Wherein, variables "S", "Q" and "actsum" are previously determined by video sequence, GOP, picture, MB initiation operations and previously performed RC parameter calculation operations. A function bitcount( ) acquires actual consumption of encoding bits for the currently generated video sequence. Such operation may adjust, for the remaining video sequence to be encoded, an average activity magnitude for MBs denoted as "avg_act", base complexity magnitudes for I pictures, P pictures and B pictures respectively denoted as "Xi", "Xp" and "Xb", and quantization scales related parameters for I pictures, P pictures and B pictures respectively denoted as "d0i", "d0p" and "d0b" contingent upon the encoding results of the acquired pictures. In step S373, it is determined whether video encoding is complete. If so, the process ends, otherwise, proceeds to step S331 for a subsequent picture.

RC settings may be dynamic changed by users or a controller resident on a video recorder during video encoding. In an situation, a video recorder detects the remaining space of storage media such as optical disks, hard disks, flash memory devices or similar, estimates and displays available recording time corresponding to the detected remaining space. When users observe that the displayed available recording time is insufficient to record the remaining video content, RC settings such as encoding bit rate, budget bit per picture, GOP structure or similar, are adjusted. In another situation, when recording a baseball game, the game proceeds to ninth inning and the scores of both teams are still tied, it is highly possible that both teams will play extra innings. When not enough storage space remains on the storage media to record the extra innings using current RC settings, the RC settings may be adjusted by users to consume less space by the tradeoff of the coding resolution. In still another situation, a controller resident on a video recorder receives total time of a TV program to be recorded, and, when determining not enough storage space remains on the storage media to record the entire TV program, the controller instructs an RC controller to adjust RC settings to consume less space. In a further situation, a controller resident on a video recorder detects transmission quality of digital TV (DTV) signals in wireless environment, and, when detecting transmission quality is bad, the controller instructs an RC controller to modify GOP structure to reduce the number of B-pictures in GOPs.

Figure 4A:
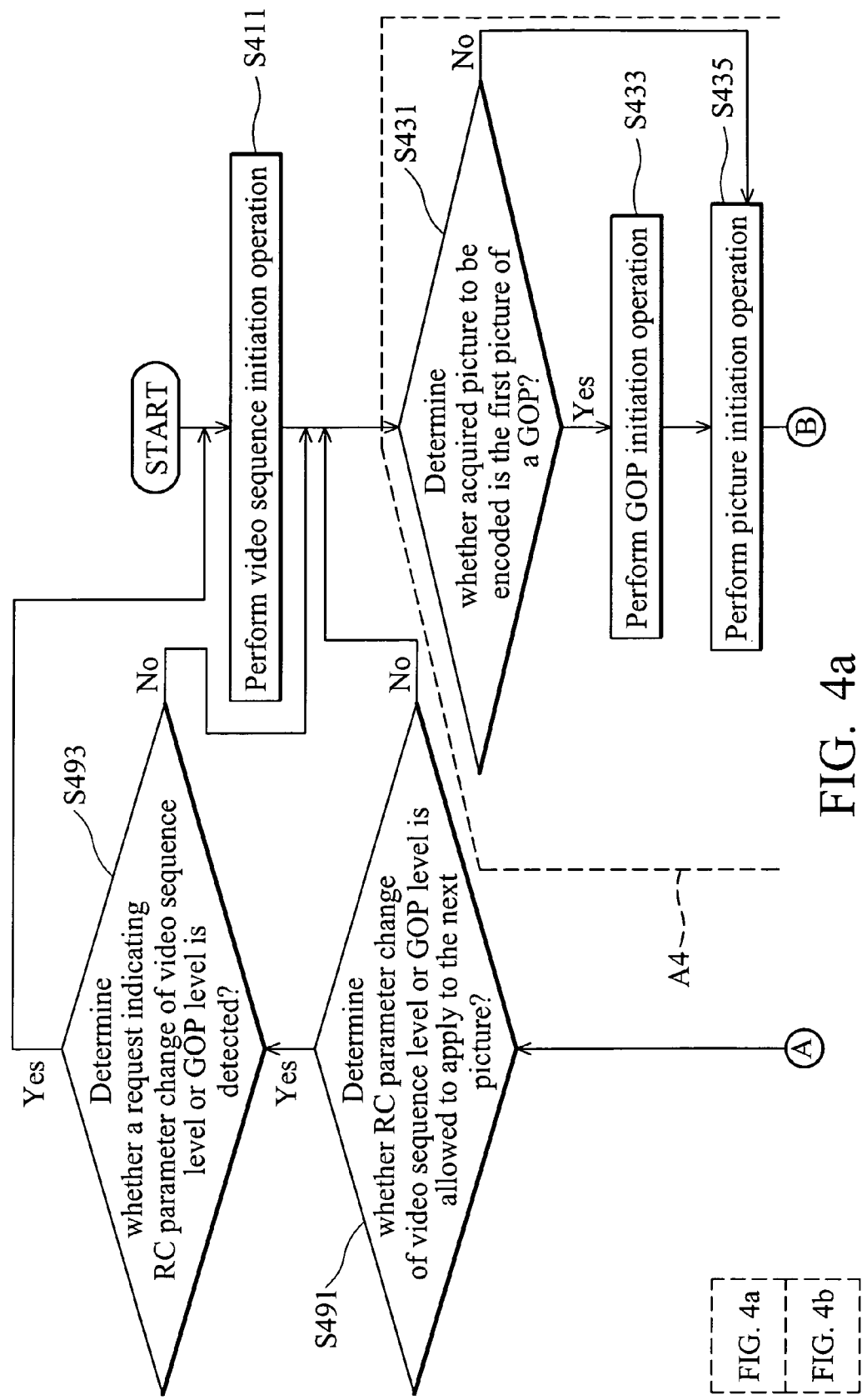
FIGS. 4a and 4b are flowcharts illustrating an embodiment of a method for rate control capable of performing RC settings changes of video sequence level or GOP level during video encoding.
Figure 4B:
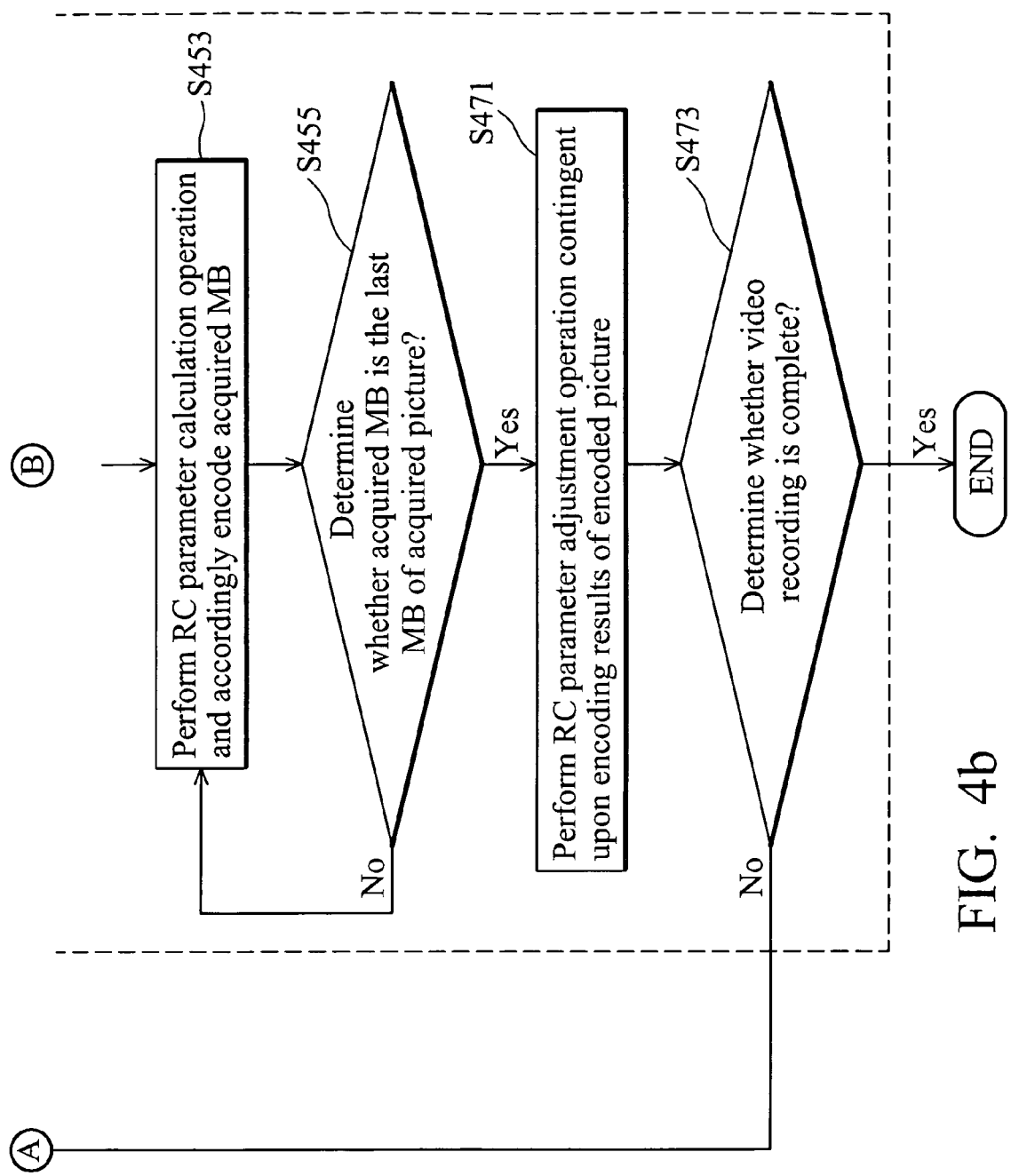

FIGS. 4a and 4b are flowcharts illustrating an embodiment of a method for rate control capable of performing RC settings changes corresponding to the video sequence level or GOP level during video encoding. In step S411, a video sequence initiation operation is performed. Details of step S411 may refer description of step S311 of FIG. 3. An encoding process A4 employing one of various algorithms such as CBR, VBR and others, including operations in steps S431 to S473 is repeatedly performed for each picture of a video sequence. An exemplary RC algorithm may refer details of steps S331 to S373 (FIG. 3). In step S473, it is determined whether video encoding is complete. If so, the process ends, otherwise, proceeds to step S491. In step S491, it is determined whether change in RC setting corresponding to video sequence level or GOP level is allowed to be applied to the next picture. If so, the process proceeds to step S493, otherwise, to step S431. The RC setting corresponding to video sequence level or GOP level, for example, may modify the original GOP structure, predetermined bit rate of a video sequence or a GOP or similar. Note that when a request indicating RC setting change is received in step S493, it is required to re-execute a video sequence initiation operation S411 in order to apply such RC setting changes corresponding to video sequence level or picture level to the subsequent pictures. The encoding algorithm may restrict the conditions for changing the RC setting, for example, the RC setting change corresponding to the video sequence level or GOP level is only allowed when the encoder is processing the first picture of a GOP. In step S493, it is determined whether a request indicating an RC setting change corresponding to the video sequence level or GOP level is detected. If so, the process proceeds to step S411, otherwise, to step S431. A user or a controller resident on a video recorder may change one or more RC setting corresponding to the video sequence level or GOP level via an user interface such as On-Screen Display (OSD), and the modified RC setting may be stored in a storage space such as a memory buffer, hard disk or similar before the RC setting change is allowed. A request indicating an RC setting change corresponding to the video sequence level or GOP level is then detected.

Figure 5A:
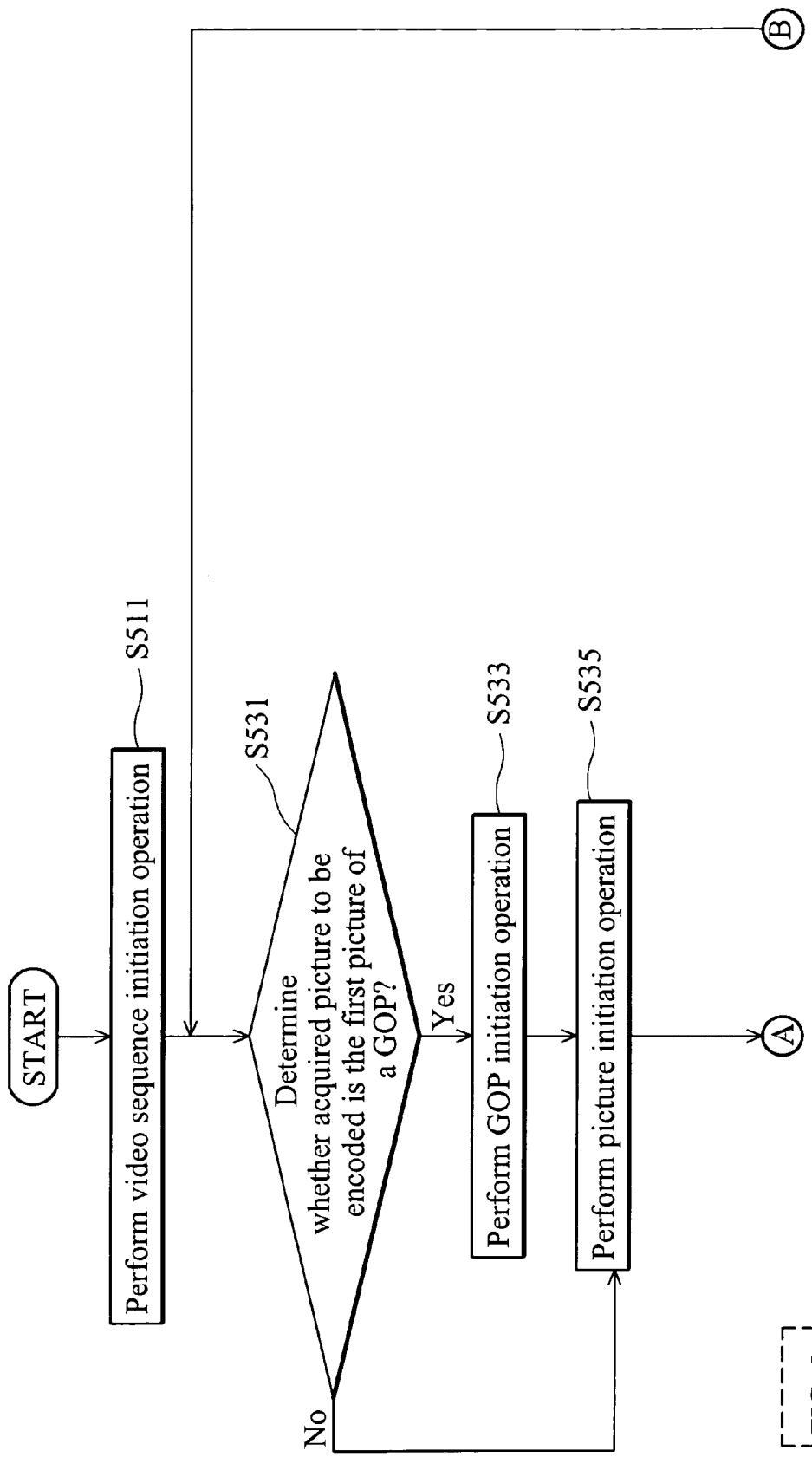
FIGS. 5a and 5b are flowcharts illustrating an embodiment of a method for rate control capable of performing RC settings changes of MB level during video encoding.
Figure 5B:
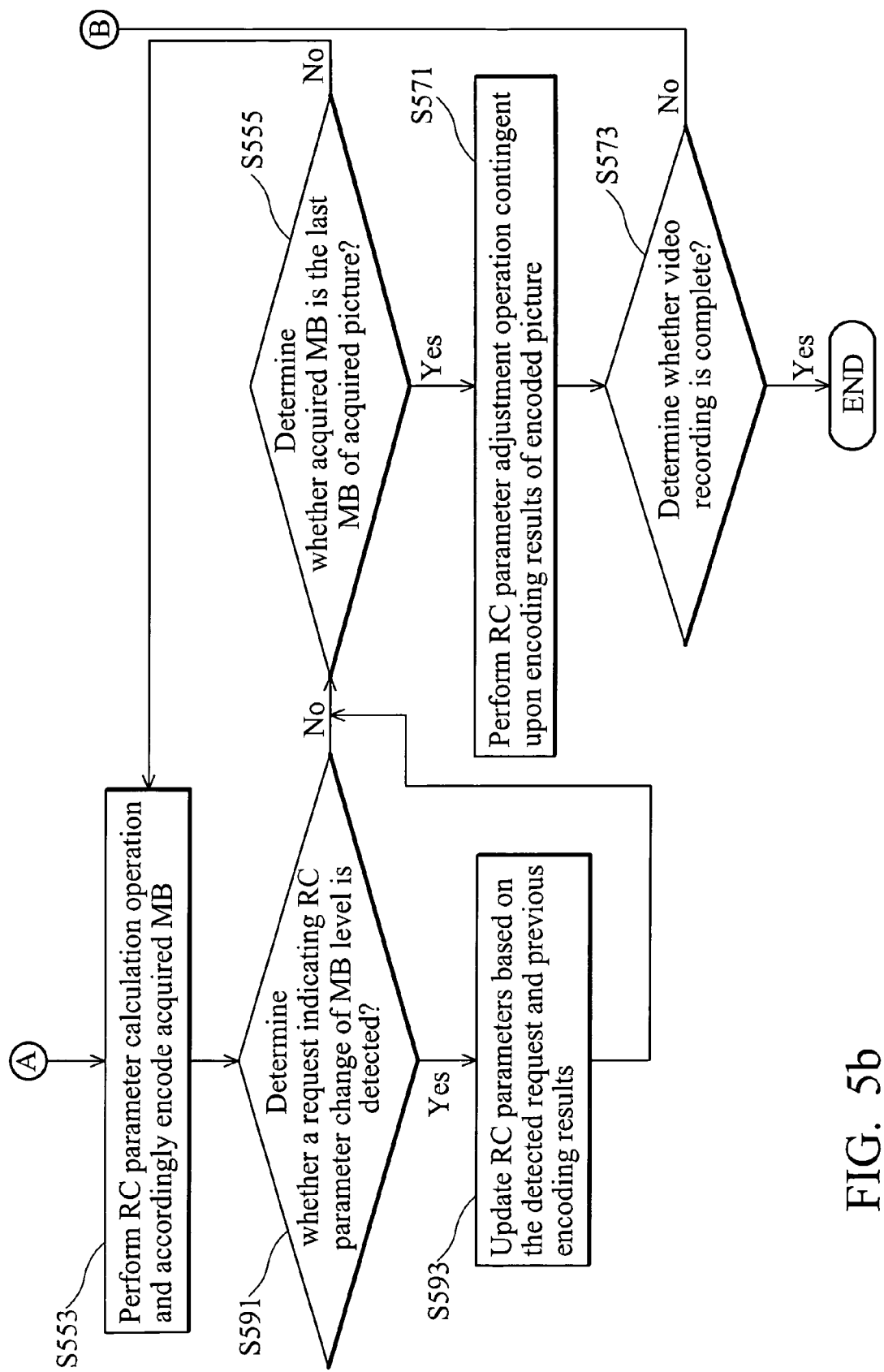
Figure 6A:
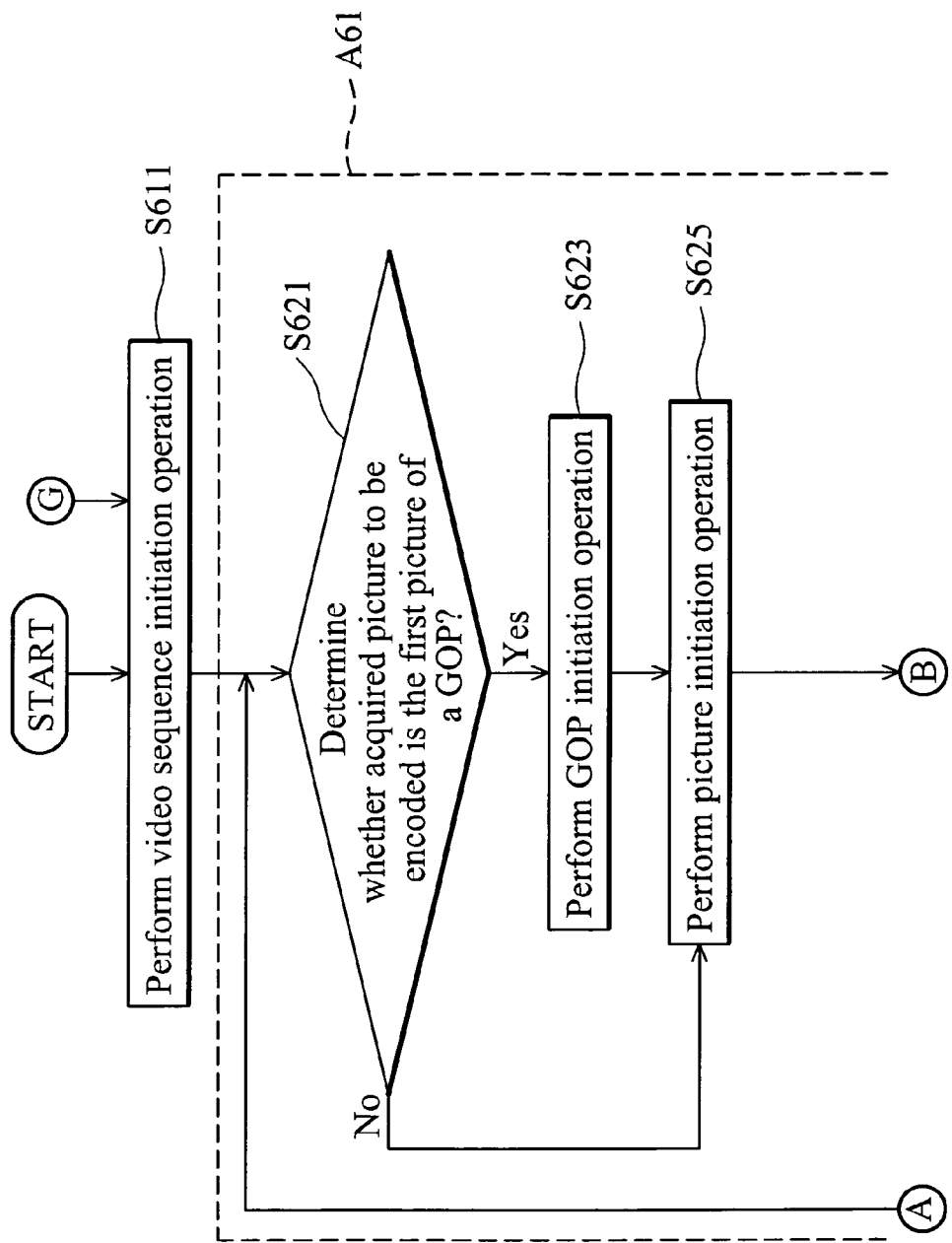
FIGS. 6a, 6b, 6c and 6d are flowcharts illustrating an embodiment of a method for rate control capable of switching to another RC algorithm during video encoding.
Figure 6B:
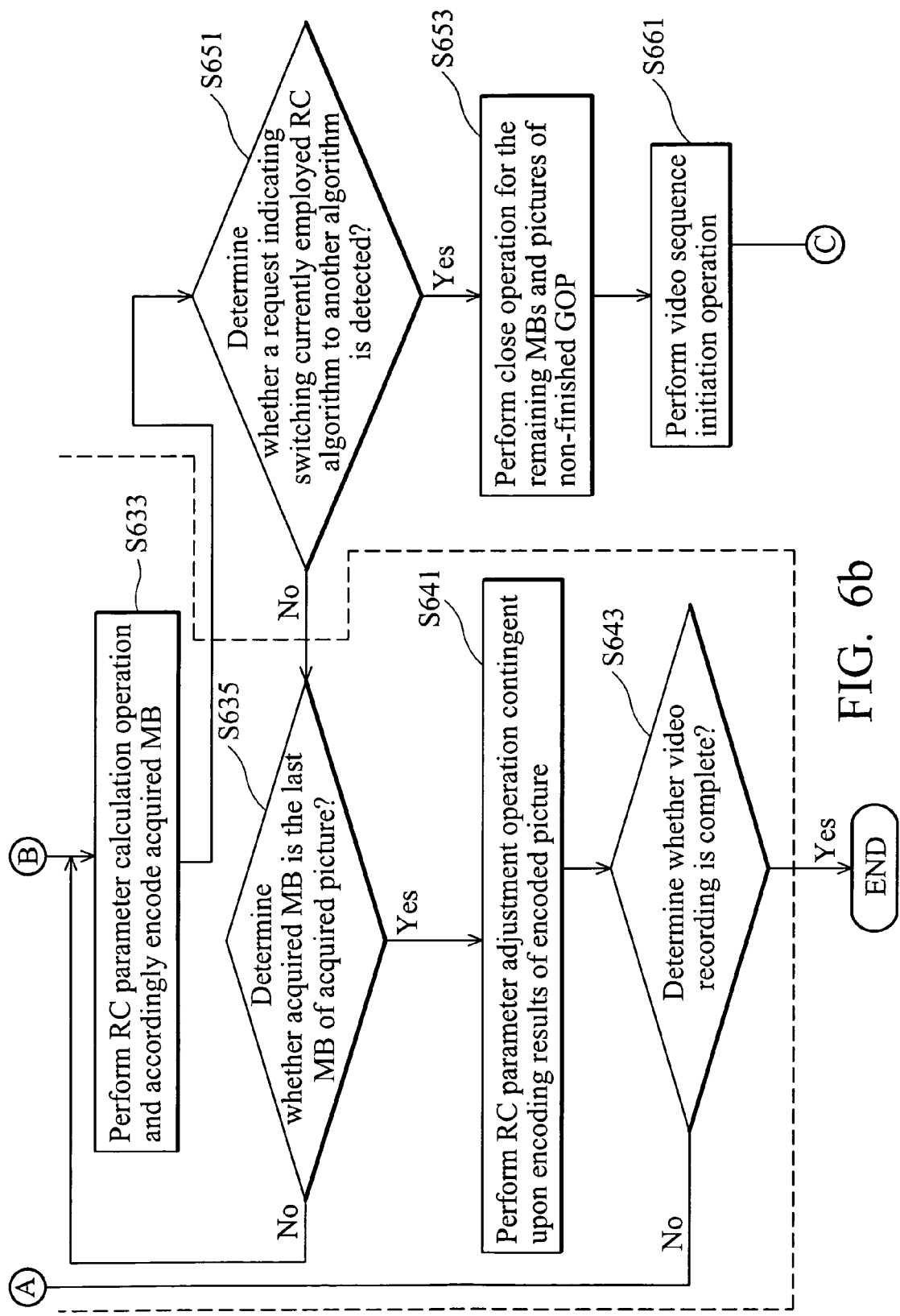
Figure 6C:
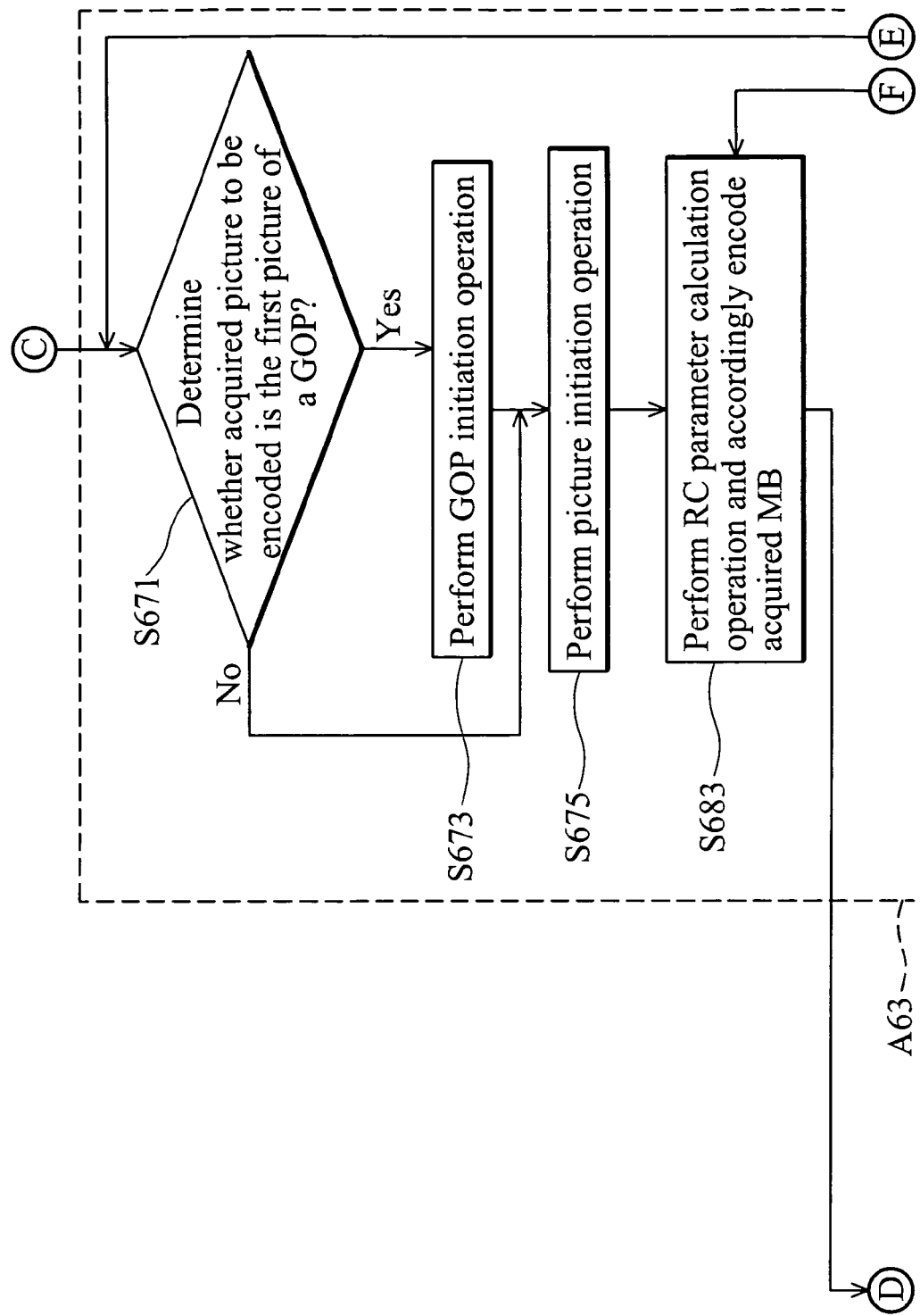
Figure 6D:
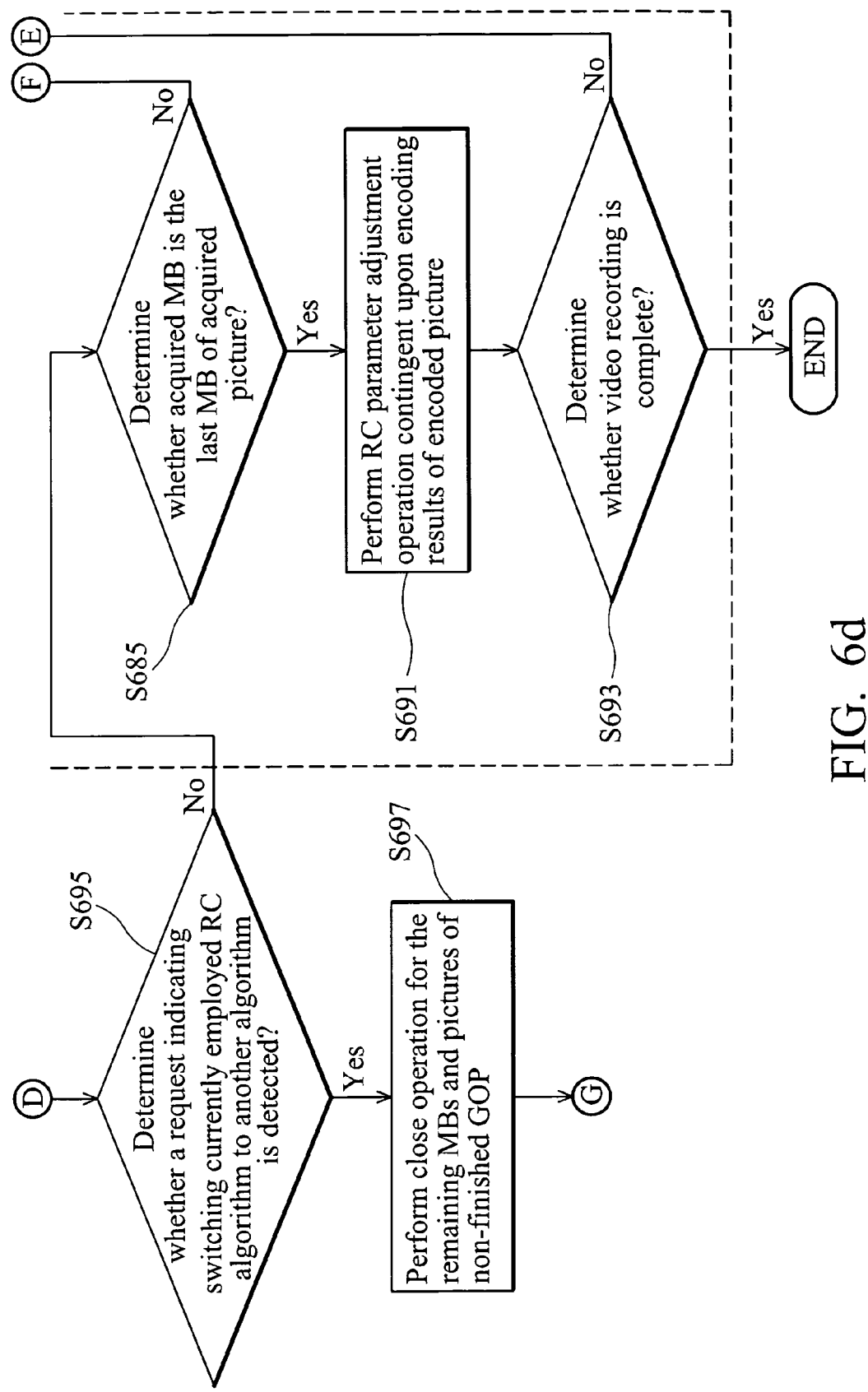
Figure 7A:
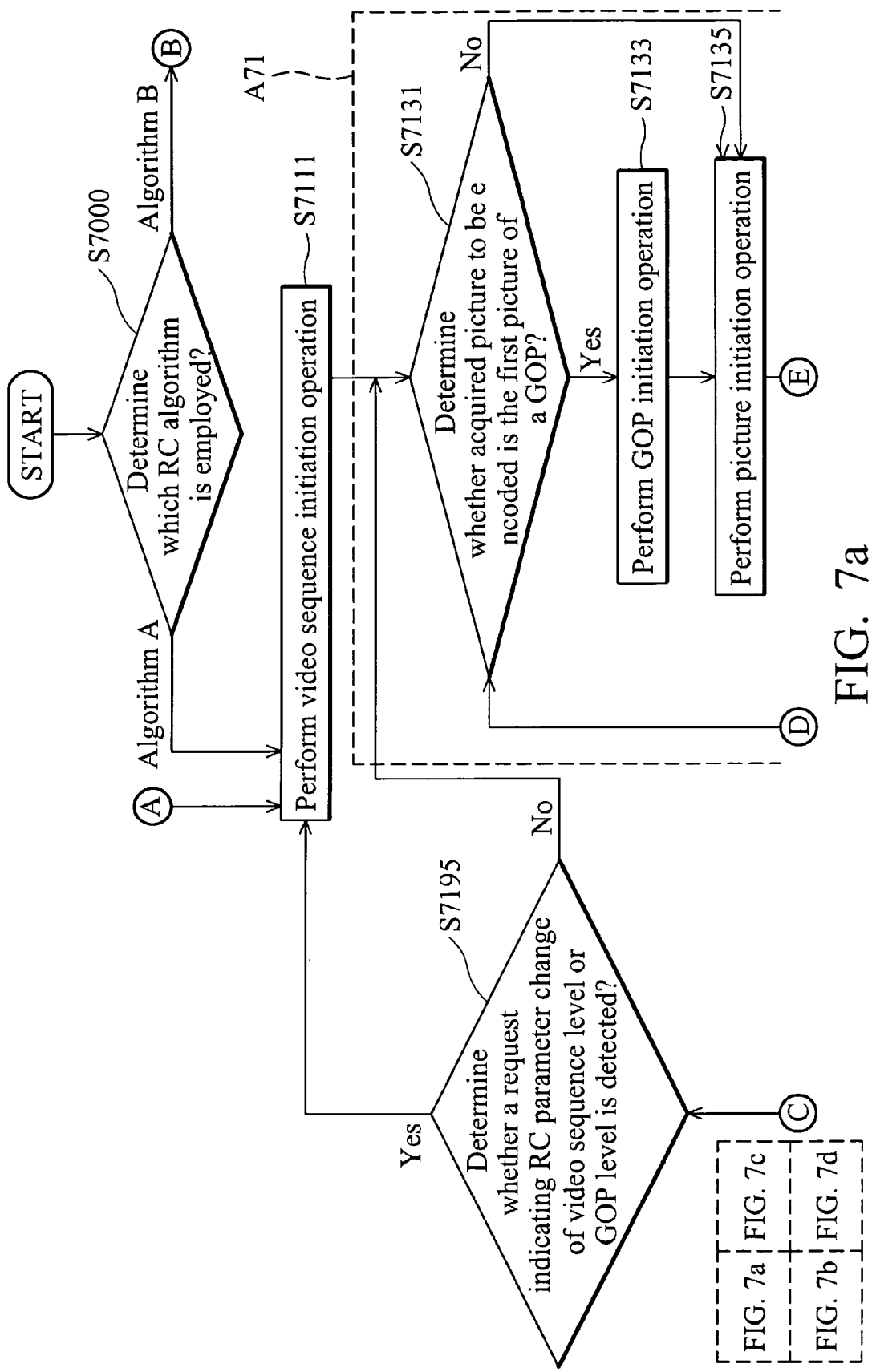
FIGS. 7a, 7b, 7c and 7d are flowcharts illustrating an embodiment of a method for rate control capable of switching between two RC algorithms during video encoding.
Figure 7B:
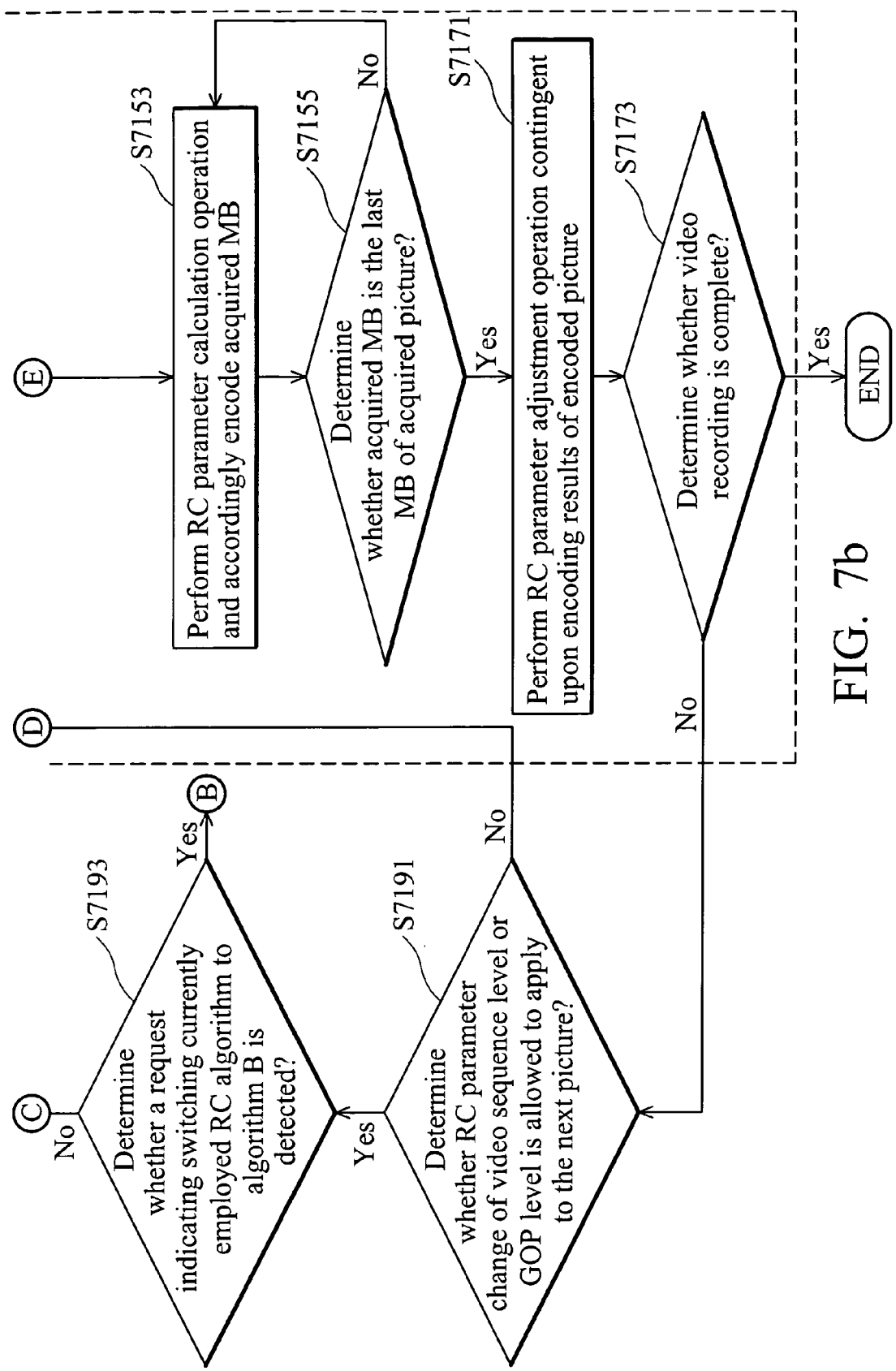
Figure 7C:
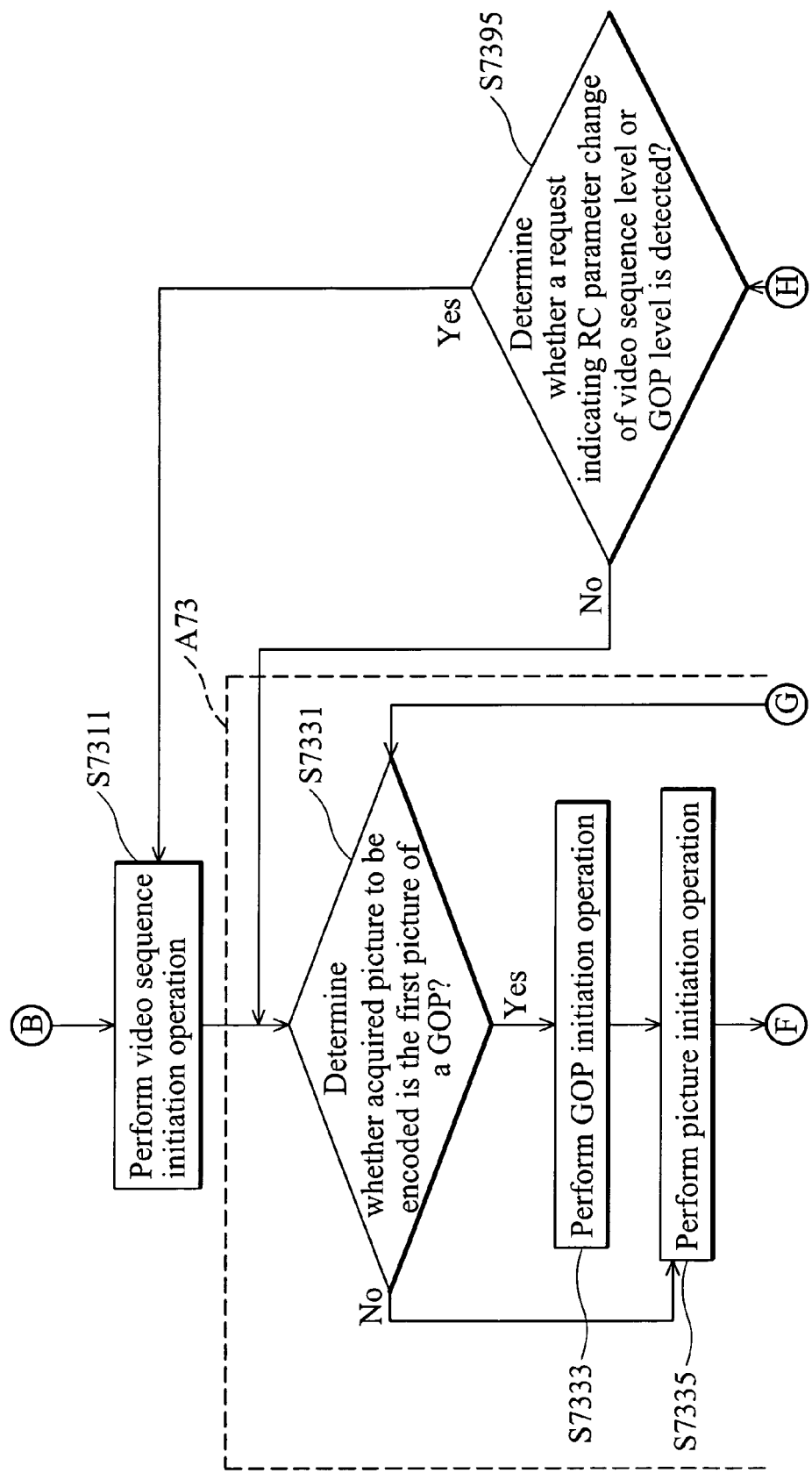
Figure 7D:
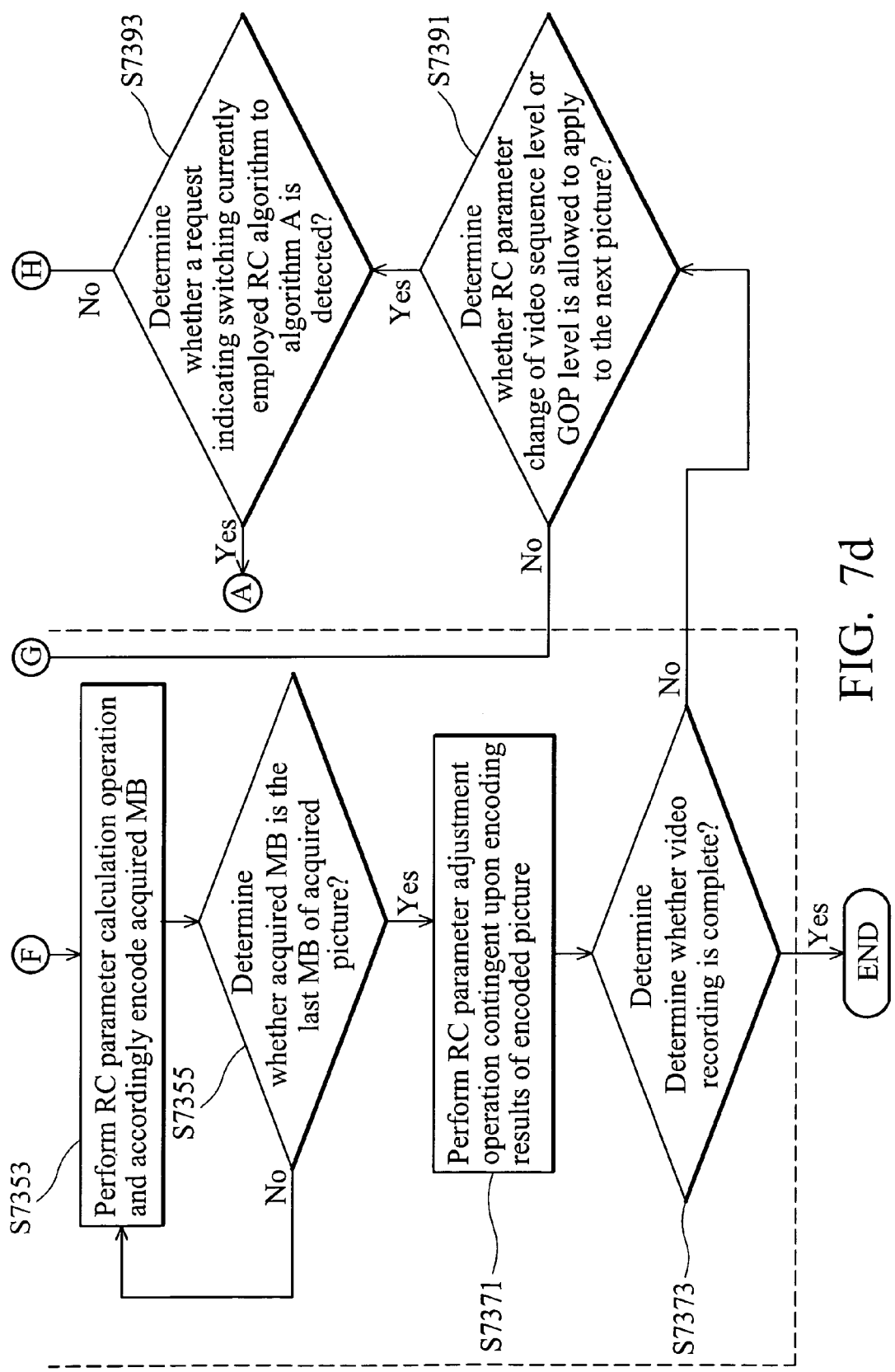

FIGS. 5a and 5b are flowcharts illustrating an embodiment of a method for rate control capable of performing RC settings changes at the MB level during video encoding. In step S511, a video sequence initiation operation is performed. Details of step S511 may refer description of step S311 of FIG. 3. An encoding process employing one of various algorithms such as CBR, VBR and others, including operations in steps S531 to S573, is repeatedly performed for each picture of a video sequence. An exemplary RC algorithm may refer details of steps S331 to S373 (FIG. 3). Note that, referring to step S553, the acquired MB is encoded based on results calculated by an RC parameter calculation operation. In step S591, it is determined whether a request indicating RC setting change of MB level is detected. If so, the process proceeds to step S593, otherwise, to step S555. RC setting change at the MB level, for example, may modify the remaining bit budget for subsequent MBs or similar. Note that it may require performing an MB initiation operation different from the operation performed in step S535, in response to the modified RC setting. In step S593, RC parameters are updated based on the detected request comprising the modified RC setting corresponding to the MB level, and previous encoding results, and thereafter, the process proceeds to step S555 for further determination. In step S555, it is determined whether an acquired MB is the last MB of an acquired picture. If so, the process proceeds to step S571, otherwise, to step S553. A user or a controller resident on a video recorder may change an RC setting corresponding to the MB level and store the modified RC setting for later RC parameter updating. A request indicating an RC setting change at the MB level is therefore detected if a new RC setting is stored.

FIGS. 6a, 6b, 6c and 6d are flowcharts illustrating an embodiment of a method for rate control capable of switching to another RC algorithm during video encoding. In step S611, a video sequence initiation operation for a video encoding process A61 is performed. The video encoding process A61 employs one of various algorithms such as CBR, VBR and others, including operations in steps S621 to S643, is repeatedly performed for each picture of a video sequence. An exemplary RC algorithm may refer to details of steps S331 to S373 (FIG. 3). In step S651, it is determined whether a request indicating switching the current RC algorithm to another RC algorithm is detected. If so, the process proceeds to step S653, otherwise, to step S635. In step S635, it is determined whether an acquired MB is the last MB of an acquired picture. If so, the process proceeds to step S641, otherwise, to step S633. Referring to step S651, a user or a controller resident on a video recorder may switch the current RC algorithm to another RC algorithm for example, switching from a CBR algorithm to a VBR algorithm. However, the encoding process may restrict the timing for RC algorithm switching, such as only allowing the RC algorithm switching occurred at the GOP or picture level. The new RC algorithm may be temporally stored in a memory device, hard disk or similar until RC algorithm switching is allowed. A request for switching to another RC algorithm is detected when there are data newly stored for RC algorithm switching. In the embodiment shown in FIGS. 6a-6d, the encoding process allows RC algorithm switching occurred at the MB level, which means the current RC algorithm may be switched to another RC algorithm after encoding any MB of a picture. Note that a close operation may be required for the remaining MBs and pictures of a non-finished GOP to be encoded after detecting the RC algorithm switching request. In step S653, a close operation is performed for the remaining MBs and pictures of a non-finished. GOP to be encoded, and thereafter, the process proceeds to step S661. In step S661, a video sequence initiation operation for a video encoding process A63 employing another algorithm is performed. The video encoding process A63 employing an RC algorithm such as CBR, VBR or others, including operations in steps S671 to S693, is repeatedly performed for each of the remaining pictures. Those skilled in the art may deduce details of operations performed in steps S671 to S693 by the analogy of steps S331 to S373 (FIG. 3) and it is only briefly described herein. In step S695 it is determined whether a request indicating switching the current RC algorithm to another RC algorithm is detected. If so, the process proceeds to step S697, otherwise, to step S685. In step S685, it is determined whether an acquired MB is the last MB of an acquired picture. If so, the process proceeds to step S691, otherwise, to step S683. Referring to step S695, a user or a controller resident on a video recorder may switch the current RC algorithm to another RC algorithm, for example, switching from a VBR algorithm to a CBR algorithm. In step S697, a close operation is performed for the remaining MBs and pictures of a non-finished GOP to be encoded, and thereafter, the process proceeds to step S611.

FIGS. 7a, 7b, 7c, and 7d are flowcharts illustrating an embodiment of a method for rate control capable of switching between two RC algorithms during video encoding. In step S7000, one RC algorithm is selected for video encoding. If RC algorithm A is employed, the process proceeds to step S7111 to perform a video sequence initiation operation for video encoding with RC algorithm A, and, if RC algorithm B is employed, the process proceeds to step S7311 to perform a video sequence initiation operation for video encoding with RC algorithm B. A video encoding process A71 employing RC algorithm A such as CBR or VBR algorithm, including operations in steps S7131 to S7173, is repeatedly performed for each picture. Those skilled in the art may deduce details of operations performed in steps S7131 to S7173 by the analogy of steps S331 to S373 (FIG. 3) and it is only briefly described herein. In step S7173, it is determined whether video encoding is complete. If so, the process ends, otherwise, proceeds to step S7191. In step S7191, for the RC algorithm A, it is determined whether an RC setting change of video sequence level or GOP level is allowed to be applied to the next picture. If so, the process proceeds to step S7193, otherwise, to step S7131. RC setting change of video sequence level or GOP level, for example, may modify the original GOP structure, predetermined bit rate or bit budget of a video sequence or a GOP or similar. Note that it is often required to re-execute a video sequence initiation operation for the RC algorithm A in order to apply such RC setting changes to the subsequent pictures. For example, the RC setting can only be modified when the first picture of a GOP is to be encoded, and if the next picture is the first picture of a GOP, an RC setting change of video sequence level or GOP level is allowed. In step S7193, it is determined whether a request indicating switching to another algorithm such as algorithm B is detected. If so, the process proceeds to step S7311 to perform a video sequence initiation operation for the algorithm B, otherwise, to step S7195. A user or a controller resident on a video recorder may send a request to switch the currently employed RC algorithm A to the RC algorithm B, for example, switching a CBR algorithm to a VBR algorithm, and the switching result may be stored in a storage device for later process. A request indicating switching the currently employed RC algorithm A to the RC algorithm B is detected when there is a newly stored switching result. In step S7195, it is determined whether a request indicating RC setting change for the algorithm A is detected. If so, the process proceeds to step S7111 to update the RC parameter, otherwise, to step S7131. Similarly, an RC setting corresponding to the video sequence level or GOP level may be modified and temporally stored in a storage device until the RC setting change is allowed.

In step S7311, a video sequence initiation operation for video encoding employing the RC algorithm B is performed. The video encoding process A73, including operations in steps S73311 to S7373, is repeatedly performed for each picture. Those skilled in the art may deduce details of operations performed in steps S7331 to S7373 by the analogy of steps S331 to S373 (FIG. 3) and it is only briefly described herein. In step S7373, it is determined whether video encoding is complete. If so, the process-ends, otherwise, proceeds to step S7391. In step S7391, for the RC algorithm B, it is determined whether an RC setting change is allowed to be applied to the next picture. If so, the process proceeds to step S7393, otherwise, to step S7331. Note that re-execution of a video sequence initiation operation for the RC algorithm B is required in order to apply such RC setting changes to the subsequent pictures. In step S7393, it is determined whether a request for switching to the algorithm A is detected. If so, the process proceeds to step S7111 to perform a video sequence initiation operation for the algorithm A, otherwise, to step S7395. In step S7395, it is determined whether a request indicating RC setting change for the algorithm B is detected. If so, the process proceeds to step S7311 to update the RC parameter, otherwise, to step S7331.

Methods for changing RC settings during video encoding, or certain aspects or portions thereof, may take the form of specific logic circuits embodied in a chip/chipset.

Figure 8:
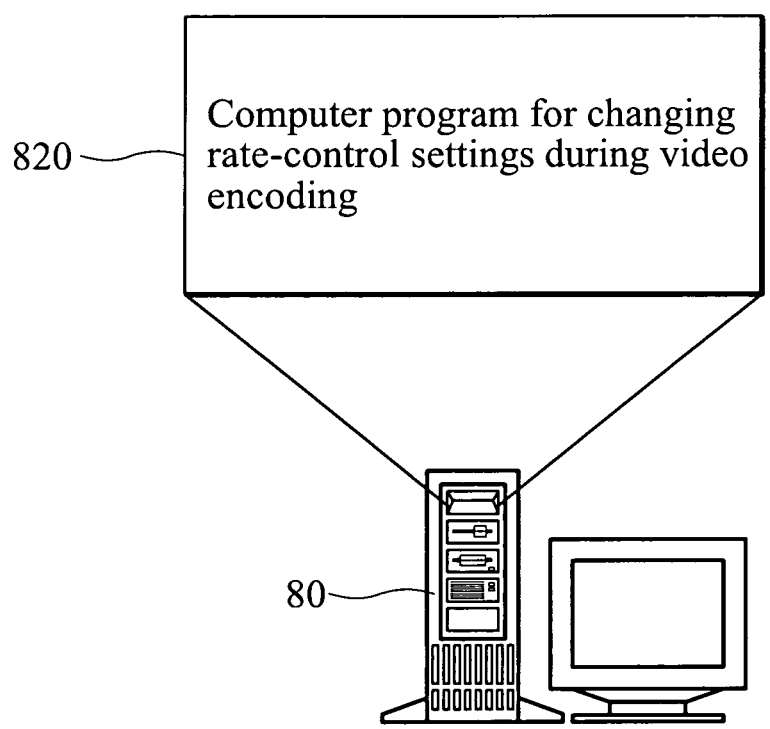
FIG. 8 is a diagram of an embodiment of a storage medium storing a computer program for changing RC settings during video encoding.

Also disclosed is a storage medium 80 as shown in FIG. 8 storing a computer program 820 executing the methods for changing RC settings during video encoding. A processing unit executes changing RC settings during video encoding by loading and executing computer readable program codes from the storage medium 80.

Methods for changing RC settings during video encoding, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method executed by a tangible processing unit for changing at least one rate-control (RC) setting during video encoding, comprising:
   determining, by a RC controller, a remaining space of a non-volatile memory for storing a video sequence;
   generating, by the RC controller, a request for changing the RC setting according to the remaining space;
   determining, by the RC controller, whether change in the RC setting is allowed for encoding a next portion of the video sequence;
   detecting, by the RC controller, the request for changing the RC setting before encoding the next portion of the video sequence; and
   executing video encoding, by a video encoder, for the next portion of the video sequence ceaselessly utilizing the changed RC setting when change in RC setting is allowed and the request is detected.

2. The method as claimed in claim 1 wherein the next portion of the video sequence is the beginning of one or more video encoding level, where the video encoding levels comprise a video sequence level, a group of pictures (GOP) level, and a picture level, the RC setting is for determining at least one RC parameter corresponding to the video sequence level or the GOP level.

3. The method as claimed in claim 2 wherein the step of executing video encoding further comprising performing re-initiation to update at least an RC parameters according to the changed RC setting when detecting the request.

4. The method as claimed in claim 3 wherein performing re-initiation further comprises performing GOP re-initiation to update at least an RC parameter for the GOP, performing picture re-initiation to update at least an RC parameter for the picture, or both.

5. The method as claimed in claim 1 further comprising performing a GOP re-initiation operation performing RC parameter initiation for each GOP of the video sequence, a picture re-initiation operation performing RC parameter initiation for each picture of the video sequence and each MB of the video sequence before executing video encoding for the next portion of the video sequence, wherein the step of executing video encoding further comprises calculating and adjusting the RC parameter for the next portion based on previous encoding results.

6. The method as claimed in claim 1 wherein the next portion is a macro block (MB) belonging to a current picture, the RC setting is for adjusting at least an RC parameter corresponding to the MB level, when the request is detected, executing an MB initiation operation for re-initiating corresponding RC parameters in response to the changed RC parameter of the MB level before encoding the next MB.

7. The method as claimed in claim 1 wherein video encoding employs a first rate control algorithm for the video sequence, the changed RC setting indicates that a second rate control algorithm is to be employed for the remaining video sequence, the step of executing video encoding for the next portion of the video sequence further comprises initiating a plurality of RC parameters of the video sequence level or the GOP level utilized by the second rate control algorithm.

8. The method as claimed in claim 7 wherein the step of executing video encoding for the next portion of the video sequence further comprises a close operation for the remaining un-coded MBs of a picture or the remaining un-coded pictures of a GOP before employing the second rate control algorithm for encoding the next portion of the video sequence.

9. A system for changing at least one rate-control (RC) setting during video encoding, comprising:
   a video encoder encoding a video sequence;
   an RC controller determining a remaining space of a non-volatile memory for storing the video sequence, generating a request for changing the RC setting according to the remaining space, determining whether change in the RC setting is allowed for encoding a next portion of the video sequence, detecting the request for changing the RC setting before encoding the next portion of the video sequence, and controlling the video encoder to encode the next portion of the video sequence ceaselessly utilizing the changed RC setting when change in RC setting is allowed and the request is detected.

10. The system as claimed in claim 9 wherein the next portion of the video sequence is the beginning of one or more video encoding levels, where the video encoding levels comprise a video sequence level, a group of pictures (GOP) level, and a picture level, the RC setting is for determining at least one RC parameter corresponding to the video sequence level or the GOP level.

11. The system as claimed in claim 10 wherein the RC controller further re-initiate to update at least an RC parameters according to the changed RC setting when detecting the request.

12. The system as claimed in claim 11 wherein the RC controller further update at least an RC parameter for the GOP and/or update at least an RC parameter for the picture.

13. The system as claimed in claim 9 wherein the RC controller further performs RC parameter initiation for each GOP of the video sequence, each picture of the video sequence, and each MB of the video sequence before executing video encoding for the next portion of the video sequence, and calculates and adjusts the RC parameter for the next portion based on previous encoding results.

14. The system as claimed in claim 9 wherein the next portion is a macro block (MB) level belonging to a current picture, the RC setting is for adjusting at least an RC parameter corresponding to the MB level, and, when the request is detected, the RC controller executes an MB initiation operation for re-initiating corresponding RC parameters in response to the changed RC parameter of the MB level before encoding the next MB.

15. The system as claimed in claim 9 wherein the video encoding employs a first rate control algorithm for the video sequence, the changed RC setting indicates that a second rate control algorithm is to be employed for the remaining video sequence, the operation for executing video encoding for the next portion of the video sequence further comprises initiating a plurality of RC parameters of the video sequence level or the GOP level utilized by the second rate control algorithm.

16. The system as claimed in claim 15 wherein the RC controller further performs a close operation for the remaining un-coded MBs of a picture or the remaining un-coded pictures of a GOP before employing the second rate control algorithm for encoding the next portion of the video sequence.

17. The method as claimed in claim 1 wherein the non-volatile memory is optical disk, hard disk, or flash memory device.

18. The system as claimed in claim 9 wherein the non-volatile memory is optical disk, hard disk, or flash memory device.

* * * * *